United States Patent
Onuma (10) Patent No.: US 10,929,682 B2
(45) Date of Patent: Feb. 23, 2021

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Kazufumi Onuma, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 113 days.

(21) Appl. No.: 16/248,016

(22) Filed: Jan. 15, 2019

(65) Prior Publication Data

US 2019/0228230 A1    Jul. 25, 2019

(30) Foreign Application Priority Data

Jan. 19, 2018    (JP) .............................. JP2018-007159

(51) Int. Cl.
*G06K 9/00* (2006.01)
*G06T 7/70* (2017.01)
(Continued)

(52) U.S. Cl.
CPC ..... *G06K 9/00751* (2013.01); *G06K 9/00724* (2013.01); *G06T 7/70* (2017.01);
(Continued)

(58) Field of Classification Search
CPC .......... G06K 9/00751; G06K 9/00724; G06K 2009/00738; G06T 7/70; G06T 15/20; H04N 21/21805
See application file for complete search history.

(56) References Cited

U.S. PATENT DOCUMENTS

2012/0293693 A1* 11/2012 Sumitomo ........... H04N 13/271
                                                              348/246
2017/0223281 A1* 8/2017 Furihata ................ G06T 15/205
(Continued)

FOREIGN PATENT DOCUMENTS

JP        2015187797 A   * 10/2015
JP        2015204512 A     11/2015

OTHER PUBLICATIONS

Saied Moezzi; Virtual View generation for 3D Digital Video; Immersive Telepresence; IEEE Multimedia vol. 4 No. 1 pp. 18-26, 1997.

*Primary Examiner* — Khai M Nguyen
(74) *Attorney, Agent, or Firm* — Canon U.S.A., Inc. IP Division (57) ABSTRACT

An information processing apparatus that provides information about a virtual viewpoint image includes: a generation unit configured to generate scene information including type information and time information, the type information indicating a type of an event occurring in an image-capturing region in which an image is captured by a plurality of cameras, the time information indicating a time when the event has occurred; and a provision unit configured to provide an output destination of material data with the scene information generated by the generation unit, the material data being generated from a plurality of captured images obtained by the plurality of cameras capturing images of the image-capturing region from different directions, the material data being used to generate the virtual viewpoint image depending on a position and an orientation of a virtual viewpoint.

17 Claims, 8 Drawing Sheets

(51) Int. Cl.
*H04N 21/218* (2011.01)
*G06T 15/20* (2011.01)
(52) U.S. Cl.
CPC ....... *G06T 15/20* (2013.01); *H04N 21/21805* (2013.01); *G06K 2009/00738* (2013.01)

(56) References Cited

U.S. PATENT DOCUMENTS

| | | | | |
|---|---|---|---|---|
| 2018/0182114 A1* | 6/2018 | Hanamoto | ................ | G06T 7/60 |
| 2019/0068945 A1* | 2/2019 | Maruyama | ........... | H04N 13/194 |
| 2020/0059675 A1* | 2/2020 | Yoshikawa | ........ | H04N 21/6587 |

* cited by examiner

|   | SCENE START | SCENE END | SCENE NAME |
|---|---|---|---|
| 1 | 00:20:30 | 00:20:50 | SECOND GOAL IN FIRST HALF |
| 2 | 00:65:50 | 00:66:30 | GOOD SAVE IN SECOND HALF |
| 3 |  |  |  |
|   |  |  |  |

INFORMATION PROCESSING APPARATUS, INFORMATION PROCESSING METHOD, AND STORAGE MEDIUM

BACKGROUND

Field of the Disclosure

The present disclosure relates to an information processing apparatus, an information processing method, and a program, and more particularly, to an information processing apparatus, an information processing method, and a program which are suitably used to generate a video image from a virtual viewpoint.

Description of the Related Art

There is a technique for synchronously capturing images of an object from a plurality of viewpoints by a plurality of cameras arranged at different positions, and generating a virtual viewpoint content (an image viewed from any virtual viewpoint) by using the images from the plurality of viewpoints obtained by image capturing. Japanese Patent Laid-Open No. 2015-204512 discusses a technique for generating and storing a virtual viewpoint content based on images obtained from a plurality of viewpoints, and reading out video image information data based on viewpoint information and visual field information, thereby acquiring any virtual viewpoint content.

However, the virtual viewpoint content has two degrees of freedom, i.e., a time when the virtual viewpoint content is obtained, and a virtual viewpoint position and orientation (a position and orientation of a virtual viewpoint). Accordingly, in the case of generating the virtual viewpoint content for a certain scene, it is difficult to appropriately determine both the time and the virtual viewpoint position and orientation. As a result, for example, a situation where no object is displayed as a result of searching for a scene may occur. Thus, in the related art, for example, it is difficult to determine the position and orientation of a virtual viewpoint and to identify a scene. Therefore, it is difficult to enhance the user's convenience when the virtual viewpoint content is generated.

SUMMARY

According to an aspect of the present disclosure, an information processing apparatus that provides information about a virtual viewpoint image includes: a generation unit configured to generate scene information including type information and time information, the type information indicating a type of an event occurring in an image-capturing region in which an image is captured by a plurality of cameras, the time information indicating a time when the event has occurred; and a provision unit configured to provide an output destination of material data with the scene information generated by the generation unit, the material data being generated from a plurality of captured images obtained by the plurality of cameras capturing images of the image-capturing region from different directions, the material data being used to generate the virtual viewpoint image depending on a position and an orientation of a virtual viewpoint.

Further features of the present disclosure will become apparent from the following description of exemplary embodiments (with reference to the attached drawings).

DESCRIPTION OF THE EMBODIMENTS

Exemplary embodiments will be described below with reference to the drawings. The present exemplary embodiment illustrates an example of a system in which a three-dimensional model about one or more objects is generated from a plurality of images captured by a plurality of image capturing apparatuses (cameras) and a virtual viewpoint content (free viewpoint content) is generated based on the three-dimensional model. For example, in the case of soccer, the objects include a player, a referee, a ball, and a goal.

The virtual viewpoint content can be generated by combining three-dimensional models of one or more objects. A method for generating three-dimensional models of objects captured by the plurality of cameras can be implemented by, for example, a volume intersection method indicated in "Virtual View generation for 3D Digital Video" (IEEE MULTIMEDIA Vol. 4 No. 1 pp. 18-26, 1997). In the volume intersection method, a space of a measurement object imaged by a plurality of cameras is divided by a small cube or rectangular parallelepiped (hereinafter referred to as "voxel"). Each voxel is geometrically converted and is projected on images captured by the cameras. It is determined whether the voxel is projected within a silhouette of an object to be modeled in the images. Further, the voxels that are determined to be projected within the silhouette in the images captured by all the cameras are registered as voxels that constitutes the object to be modeled. Thus, a set of voxels registered as described above is output as a three-dimensional model.

In order to generate the three-dimensional model from the images captured by the plurality of cameras as described above, a large number of calculations and a long calculation time are generally required. In particular, in the case of generating a three-dimensional model with a high resolution, there is a need to reduce the size of each voxel. As the size of each voxel is reduced, the number of voxels increases. As a result, the number of times of determination as to whether the geometrically converted voxels are projected within the silhouette increases. Accordingly, a system is configured using a material data generation apparatus (image processing server, etc.) that preliminarily generates and stores texture data and the like holding a three-dimensional model and color information about each voxel of the three-dimensional model as material data. According to this system, it is possible to prevent execution of processing of generating a three-dimensional model every time a virtual viewpoint content is generated, and to enhance the efficiency of processing.

In such a system, for example, in a case where a video image generation apparatus that generates a virtual viewpoint content using material data generates a virtual viewpoint content, the material data that is preliminarily generated and stored can be acquired from the material data generation apparatus and a video image can be generated. A time at which the video image is to be generated from the virtual viewpoint content may be designated, and then the position, orientation, viewing angle, and the like of the virtual viewpoint for outputting the video image may be set, and the video image may be generated based on the setting.

However, when the data of these virtual viewpoint contents is accessed to generate a video image from a virtual viewpoint in a desired scene, there is a need to identify the desired scene by scanning the time in the long recorded time. Accordingly, the convenience for the user may be insufficient. For example, in the case of a stadium game, such as soccer, it may be difficult to recognize the entire game from the virtual viewpoint of a specific location. In this case, there is a need to scan the time and the position and orientation of the virtual viewpoint, which may lead to a deterioration in the user's convenience.

After the scene is actually identified, for example, the position and orientation of the virtual viewpoint may be moved. It may be desirable to vary, for each virtual viewpoint content, the moving speed, movement range, or the like of, for example, the position and orientation of the virtual viewpoint. For example, the desirable moving speed of the virtual viewpoint content obtained from an image obtained by capturing an image of a ground game is higher than that of the virtual viewpoint content obtained from an image obtained by capturing an image of indoors. In other words, it is desirable that the moving speed with respect to the virtual viewpoint content obtained from the image obtained by capturing an image of indoors be set to about a walking speed, and that the moving speed with respect to the virtual viewpoint content obtained from the image obtained by capturing an image of a ground game be set to a player's running speed, or a ball speed. Making a setting for designation and/or operation of the virtual viewpoint, which can be determined to some extent depending on the virtual viewpoint content, by the user every time processing is performed may lead to a deterioration in the user's convenience.

Accordingly, in the present exemplary embodiment, the information for assisting the generation and operation of the virtual viewpoint depending on the virtual viewpoint content is generated and stored in advance. In the case of generating a video image from a virtual viewpoint by using the virtual viewpoint content, the user acquires the information, thereby making it possible to use, for each virtual viewpoint content, information about different scenes, the position of the virtual viewpoint, the moving speed of the virtual viewpoint, and the like. Consequently, it is possible to generate a video image from a virtual viewpoint, without the need for the user to search for a scene and adjust the virtual viewpoint every time processing is performed.

The present exemplary embodiment illustrates an example of generating a video image from a virtual viewpoint by capturing an image of a state of a game in a stadium, as an example of details of a system and processing for executing the processing. However, the target of the video image from the virtual viewpoint is not limited to this. For example, the video image from the virtual viewpoint may be generated based on an image obtained by capturing an image of a concert hall, a martial arts venue for Japanese-style wrestling (Sumo), or an image capturing studio.

System Configuration

Figure 1:
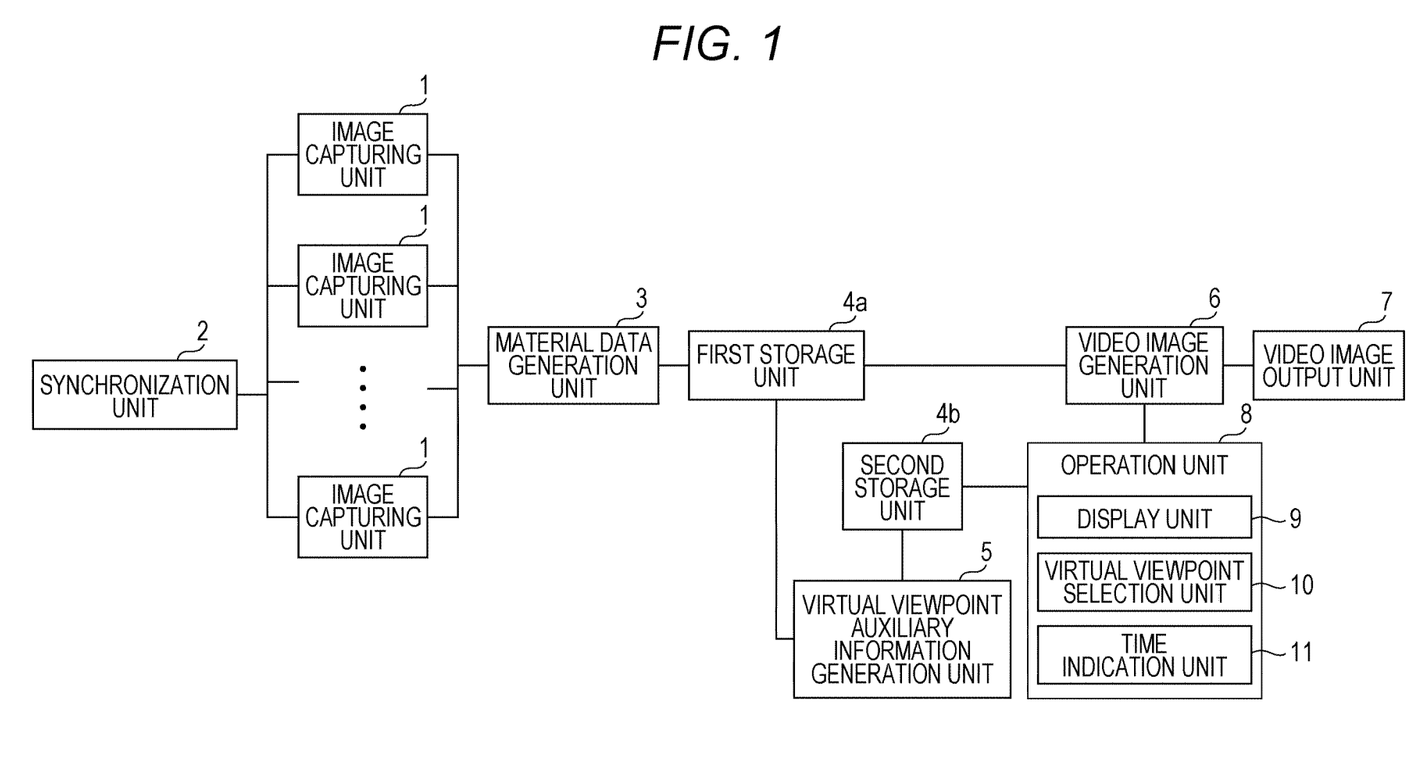
FIG. 1 is a diagram illustrating a configuration of an information processing system.
Figure 2:
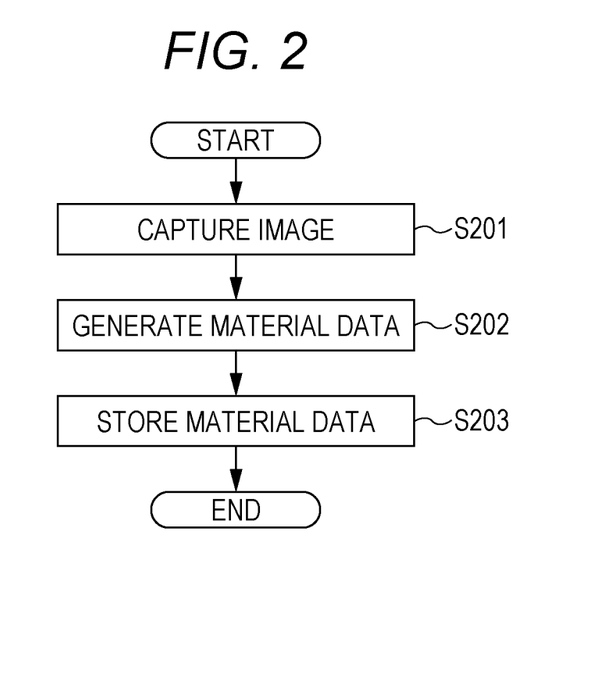
FIG. 2 is a flowchart illustrating processing to be performed when material data is generated.
Figure 3:
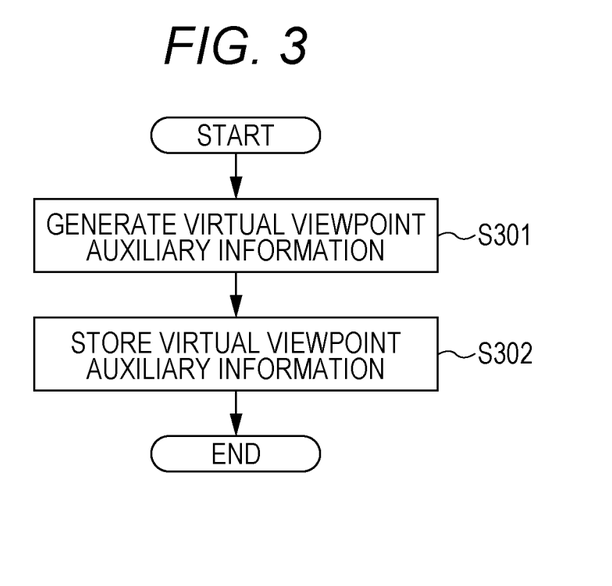
FIG. 3 is a flowchart illustrating processing to be performed when virtual viewpoint auxiliary information is generated.
Figure 4:
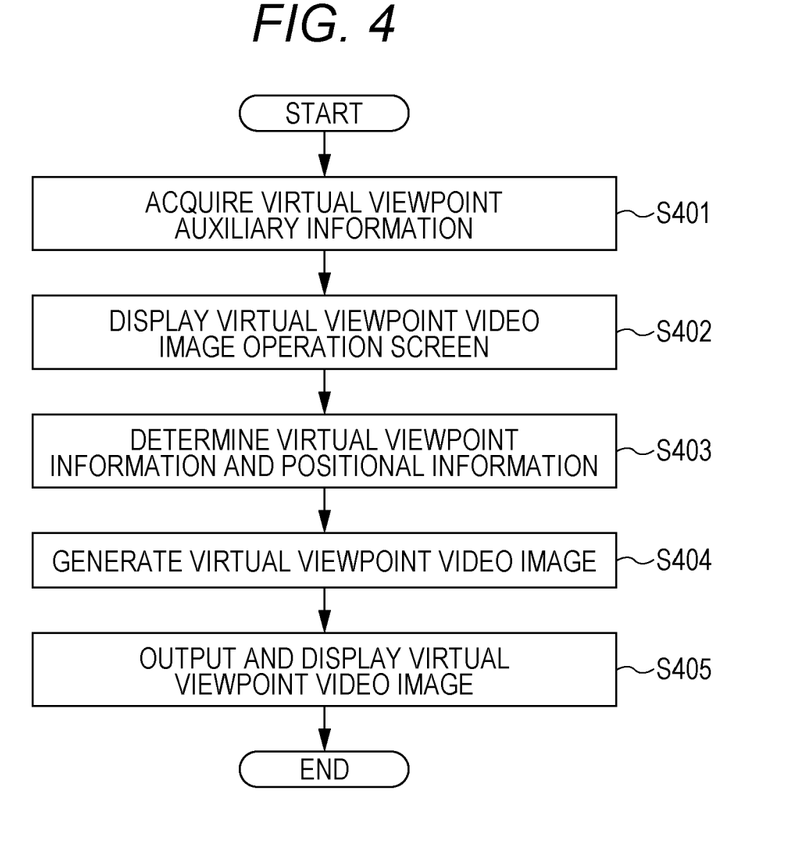
FIG. 4 is a flowchart illustrating processing to be performed when a video image from a virtual viewpoint is generated.

FIG. 1 is a diagram illustrating an example of a configuration of an information processing system according to the present exemplary embodiment. FIGS. 2 to 4 are flowcharts each illustrating an example of processing in the information processing system. FIG. 2 is a flowchart illustrating an example of processing in the information processing system when the material data is generated and stored. FIG. 3 is a flowchart illustrating an example of processing in the information processing system when the virtual viewpoint auxiliary information is generated and stored. FIG. 4 is a flowchart illustrating an example of processing in the information processing system when the video image from the virtual viewpoint is generated and output.

The information processing system includes, for example, image capturing units 1, a synchronization unit 2, a material data generation unit 3, a first storage unit 4a, a second storage unit 4b, a virtual viewpoint auxiliary information generation unit 5, a video image generation unit 6, a video image output unit 7, and an operation unit 8. The information processing system may be composed of one electronic device, or may be composed of a plurality of electronic devices.

Figure 5:
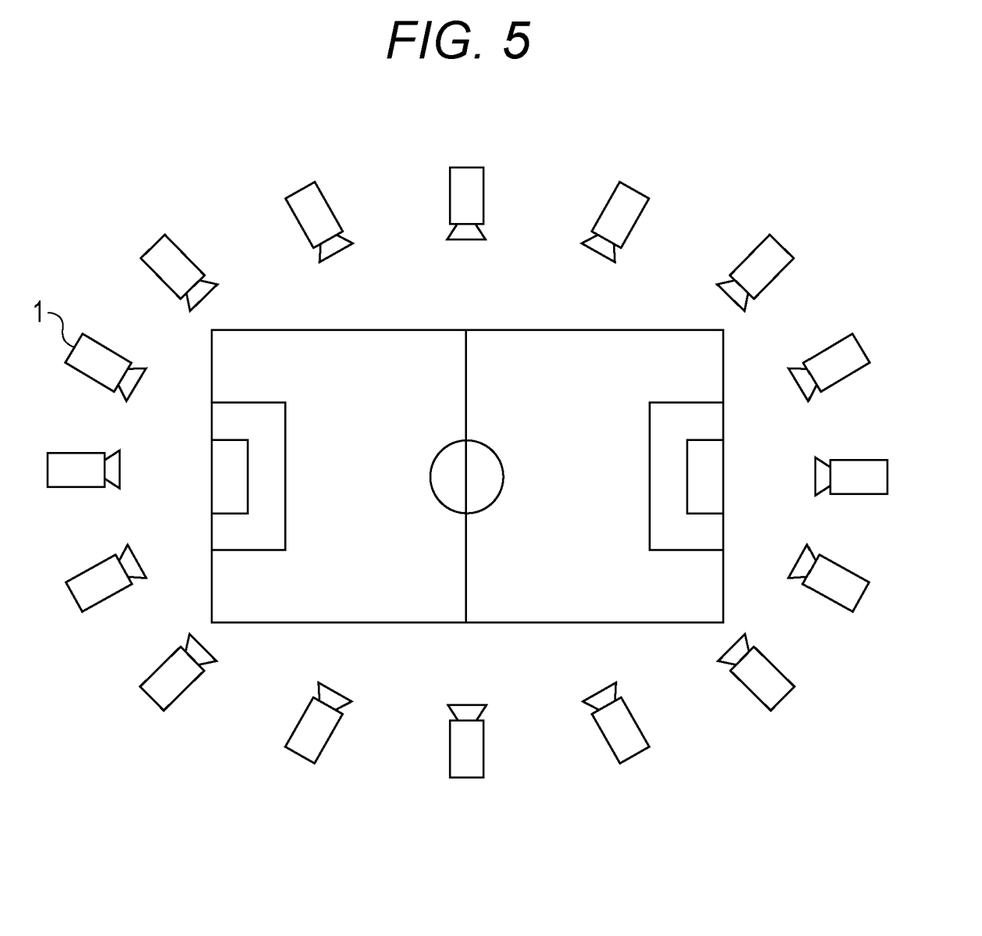
FIG. 5 is a diagram illustrating an arrangement of a plurality of image capturing units.

The plurality of image capturing units 1 captures images of an image capturing object from a plurality of directions. The plurality of image capturing units 1 performs synchronous image capturing with a high accuracy based on a synchronization signal from the synchronization unit 2 (S201 in FIG. 2). FIG. 5 is a diagram illustrating an example of the arrangement of the plurality of image capturing units 1. As illustrated in FIG. 5, the plurality of image capturing units 1 can be installed so as to surround a background or an object. In this case, the plurality of image capturing units 1 sends captured data to the material data generation unit 3 via a communication network. Alternatively, the captured data may be recorded on a storage device provided in the image capturing units 1, and the captured data may be input to the material data generation unit 3 after image capturing. Each of the image capturing units 1 transmits the image (captured image) obtained by capturing an image to the material data generation unit 3. The material data generation unit 3 generates the material data to be used for generating the video image from the virtual viewpoint by using the image captured from a plurality of viewpoints by the plurality of image capturing units 1 (S202 in FIG. 2). The first storage unit 4a obtains the material data from the material data generation unit 3 and stores the material data (S203 in FIG. 2).

The material data is data used as material for generating a virtual viewpoint video image generated based on the image captured by the image capturing unit 1. The material data includes, for example, one or both of an object three-dimensional model, which is data on each voxel indicating the object three-dimensional model, and object texture for coloring each voxel of the object three-dimensional model. Further, the material data can include one or both of a background three-dimensional model, which is polygon data for projecting a background other than the object, and a background texture image to be attached to the polygon of the background three-dimensional model. Furthermore, the material data can include one or both of a polygon model for the object and texture for the polygon of the object to be attached to the polygon of the object so as to reduce the amount of data transfer. The three-dimensional model of the material data can be generated by, for example, using the above-described volume intersection method. However, the three-dimensional model of the material data may be generated using a method other than the volume intersection method, or the three-dimensional model may be generated by any other method. Other pieces of material data can be generated by any method.

The virtual viewpoint auxiliary information generation unit 5 generates virtual viewpoint auxiliary information (S301 in FIG. 3). The second storage unit 4b obtains the generated virtual viewpoint auxiliary information from the virtual viewpoint auxiliary information generation unit 5 and stores the virtual viewpoint auxiliary information (S302 in FIG. 3).

The virtual viewpoint auxiliary information is information for assisting the user's operation to be performed when the video image from the virtual viewpoint is generated. The virtual viewpoint auxiliary information includes, for example, virtual viewpoint position and orientation information indicating the position and orientation of the virtual viewpoint. The virtual viewpoint auxiliary information also includes, for example, a recommended value of the moving speed of the virtual viewpoint and a movable range when the virtual viewpoint is operated (changed). The virtual viewpoint auxiliary information also includes, for example, scene identifying information as a combination of an identifier for identifying a scene within the virtual viewpoint content and time information indicating the time of the scene. The virtual viewpoint auxiliary information also includes, for example, object identifying information.

For example, in the case of a soccer game, the virtual viewpoint position and orientation information is information indicating a virtual viewpoint capable of viewing the hack of a goalkeeper, a virtual viewpoint capable of viewing a position for a corner kick, and the like. Information indicating the position and orientation of the virtual viewpoint that can be assumed based on the game or content is stored as a preset in the second storage unit 4b.

Figure 6:
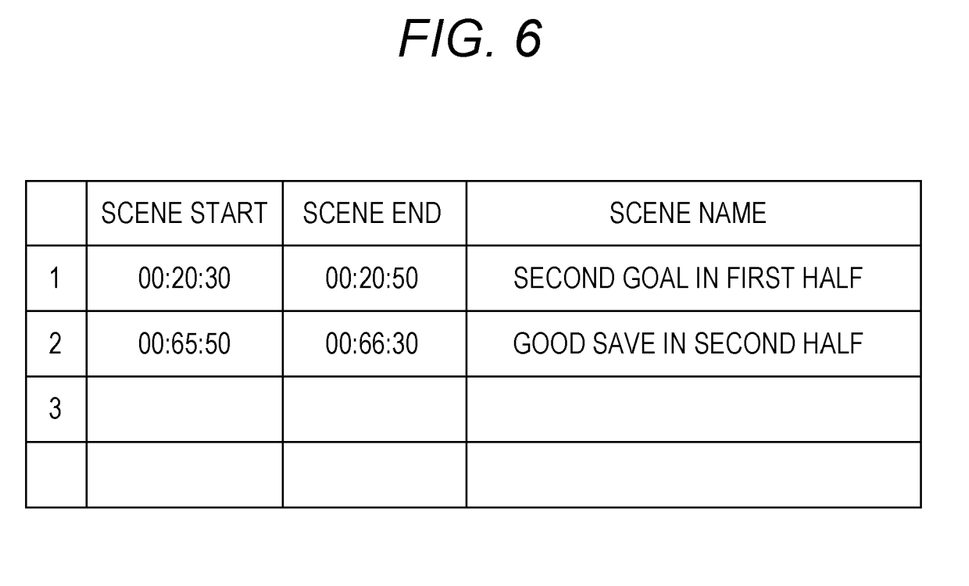
FIG. 6 is a diagram illustrating a scene identifying information.

FIG. 6 is a diagram illustrating, in a table format, an example of the scene identifying information. As illustrated in FIG. 6, the scene identifying information includes an identifier (scene name) for identifying a scene, and an image capturing time (time of scene start and time of scene end) for the scene. For example, a scene name, such as "second goal in first half", is included in the scene identifying information as a scene identifier for a highlight scene such as a goal scene. In addition, keywords, such as "goal" and "second point", are provided to the identifier, thereby facilitating the search for a scene, By further providing keywords, such as "player name" and "team name", to the scene name, the search for a scene can be further facilitated.

The object identifying information is information for facilitating the identification of an object within a viewing angle during the operation (change) of the virtual viewpoint. Details of the object identifying information will be described below.

Details of a method for generating the virtual viewpoint auxiliary information will be described below.

The operation unit 8 receives an input from the user, and provides a user interface for presenting information to the user. The operation unit 8 includes a combination of, for example, a touch panel, a button, a keyboard, and a display. Before generating the video image from the virtual viewpoint, the operation unit 8 acquires the virtual viewpoint auxiliary information from the second storage unit 4b (S401 in FIG. 4). The operation unit 8 reflects the acquired virtual viewpoint auxiliary information in each part of the operation unit 8.

Figure 7:
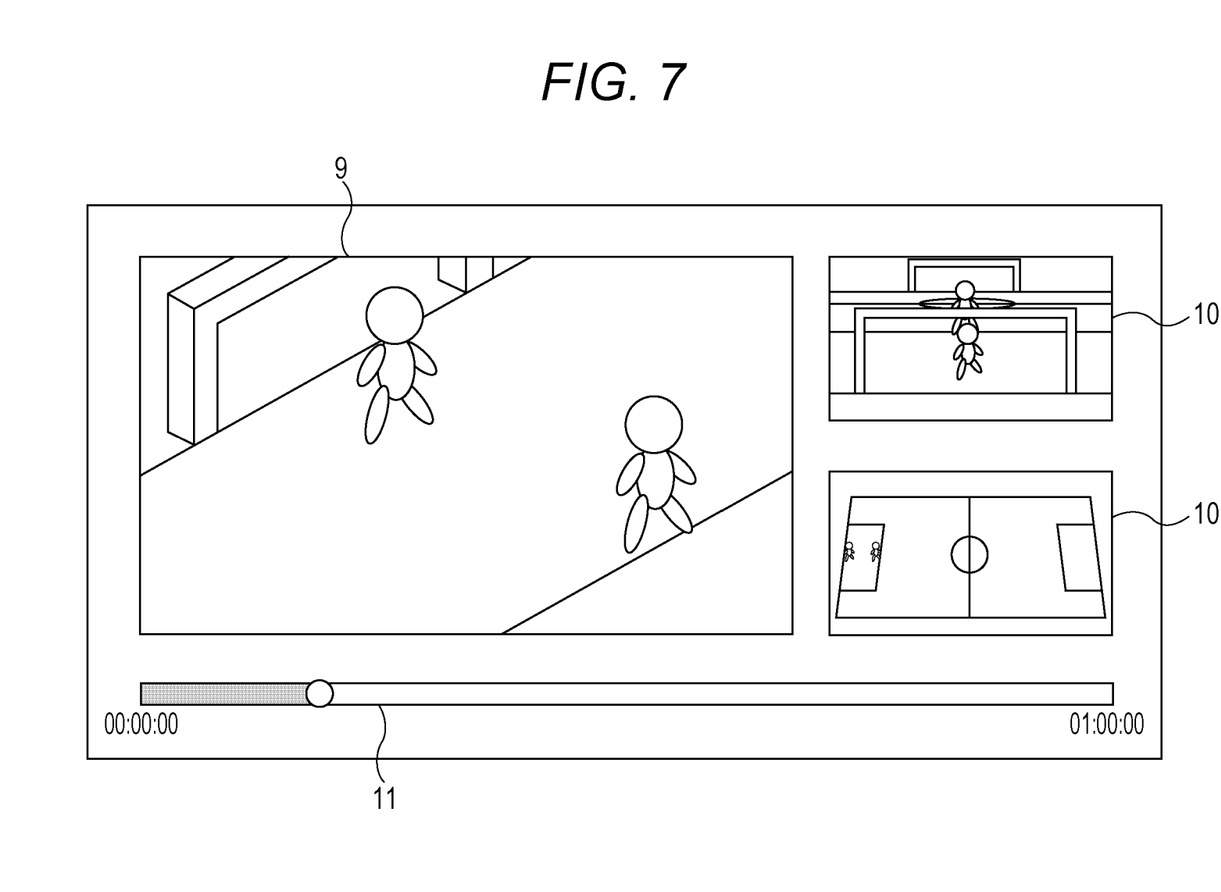
FIG. 7 is a diagram illustrating a virtual viewpoint video image operation screen.

The operation unit 8 includes, as its functions, for example, a display unit 9, a virtual viewpoint selection unit 10, and a time indication unit 11. FIG. 7 is a diagram illustrating an example of a virtual viewpoint video image operation screen. The operation unit 8 displays, for example, the virtual viewpoint video image operation screen as illustrated in FIG. 7, and receives an operation from the user (S402 in FIG. 4). In other words, the operation unit 8 works as a display control unit to display the virtual viewpoint video image on the display unit 9 and virtual viewpoint selection unit 10.

On the virtual viewpoint video image operation screen illustrated in FIG. 7, the display unit 9 displays the video image from the virtual viewpoint generated from the virtual viewpoint at which the user is currently operating. In the case of starting the generation of a certain virtual viewpoint content, the operation unit 8 can display, on the display unit 9, the video image from a predetermined virtual viewpoint of the content designated by the user using an input unit (not illustrated). In such a case, the user first operates the video image from the virtual viewpoint displayed on the display unit 9.

The virtual viewpoint selection unit 10 displays, as a thumbnail image, the video image from the virtual viewpoint based on the virtual viewpoint position and orientation information included in the virtual viewpoint auxiliary information. This thumbnail image is a candidate for the video image from the virtual viewpoint to be generated. When the user selects the thumbnail image by using the input unit (not illustrated), the display unit 9 changes the video image from the virtual viewpoint at which the user is currently operating, into the video image from the virtual viewpoint corresponding to the selected thumbnail image. As a result, the user can perform the viewpoint operation from the same virtual viewpoint as that for the selected thumbnail image. The time indication unit 11 designates the time for the video image from the virtual viewpoint to be generated.

Based on the user's operation on the input unit (not illustrated), the operation unit 8 operates and determines the position, orientation, and viewing angle of the virtual viewpoint on the video image from the virtual viewpoint (S403 in FIG. 4). The operation unit 8 outputs, to the video image generation unit 6, the virtual viewpoint information (position, orientation, and viewing angle of the virtual viewpoint) determined as described above and the time information (time of the video image from the virtual viewpoint) designated by the time indication unit 11. As the input unit for operating the virtual viewpoint, a 3D mouse or the like may be used. In addition, for example, the virtual viewpoint information may be determined by an operation performed through a graphical user interface (GUI), or by receiving an operation by a dedicated operation unit. Further, the moving speed and the like of the virtual viewpoint input by the input unit at this time are changed into a speed based on a recommended moving speed included in the virtual viewpoint auxiliary information. In this manner, the moving speed and the like of the virtual viewpoint are controlled when the user changes the virtual viewpoint by using the input unit.

The video image generation unit 6 acquires the material data from the first storage unit 4a based on the virtual viewpoint information and time information output from the operation unit 8, and generates a video image from a virtual viewpoint (S404 in FIG. 4). The video image from the virtual viewpoint generated by the video image generation unit 6 is output and displayed onto, for example, the display unit 9 of the operation unit 8 and the video image output unit 7 (S405 in FIG. 4).

With this configuration, the use of the virtual viewpoint auxiliary information stored in the second storage unit 4b enables the operation unit 8 to easily perform setting for operating the virtual viewpoint suitable for the content (material data) in the first storage unit 4a, and identification of the preset position and orientation of the virtual viewpoint, or a scene. Furthermore, the convenience of the user when the video image from the virtual viewpoint is generated and displayed can be enhanced.

Example of Method for Generating Virtual Viewpoint Auxiliary Information

The virtual viewpoint auxiliary information can be generated based on at least one of, for example, a setting based on a user input, material data for generating a video image from a virtual viewpoint, and a content type about the video image from the virtual viewpoint. As the method for generating the virtual viewpoint auxiliary information, either one of the method of generating the virtual viewpoint auxiliary information by a manual input and the method of automatically generating the virtual viewpoint auxiliary information by analyzing the virtual viewpoint content for which the video image from the virtual viewpoint is generated may be employed. The method of generating the virtual viewpoint auxiliary information by a manual input and the method of automatically generating the virtual viewpoint auxiliary information will be described by taking virtual viewpoint position and orientation information, the recommended moving speed of the virtual viewpoint, and the movable range of the virtual viewpoint as examples.

In the case of generating the virtual viewpoint position and orientation information by a manual input, for example, the virtual viewpoint position and orientation information can be generated by preliminarily inputting a viewpoint suitable for a game or the like. As described above, in the case of a soccer game or the like, the virtual viewpoint position and orientation information on the viewpoint capable of viewing the back of a goalkeeper, or a position for a corner kick can be generated.

Instead of manually inputting the viewpoint suitable for each game, the virtual viewpoint auxiliary information generation unit 5 may preliminarily hold a viewpoint suitable for each game as a preset for each game, and may generate the virtual viewpoint position and orientation information from the viewpoint for each game. In this case, the actual game space may be different from stadium to stadium depending on the game. In this case, the virtual viewpoint auxiliary information generation unit 5 can correct and generate the virtual viewpoint position and orientation information based on the three-dimensional model of the background by referring to the three-dimensional model of the background of the material data. In addition, the virtual viewpoint auxiliary information generation unit 5 can generate the virtual viewpoint position and orientation information based on at least one of the image capturing range of the image capturing unit 1 and the movable range of the virtual viewpoint so that a corner position in the range, or the range can be viewed. In the case of generating the virtual viewpoint position and orientation information by a manual input, the line connecting the first storage unit 4a and the virtual viewpoint auxiliary information generation unit 5 to each other in FIG. 1 can be omitted.

Further, in the case of automatically generating the virtual viewpoint position and orientation information, for example, the virtual viewpoint auxiliary information generation unit 5 can refer to the material data stored in the first storage unit 4a and generate the virtual viewpoint position and orientation information based on the material data. In this case, for example, the virtual viewpoint auxiliary information generation unit 5 can obtain the position and orientation of an object from coordinate data on the three-dimensional model of the object by referring to the three-dimensional model of the object. The virtual viewpoint auxiliary information generation unit 5 can generate the virtual viewpoint position and orientation information based on the position and orientation of the object so that the object of the video image from the virtual viewpoint can be constantly captured.

Next, the recommended moving speed and movable range of the virtual viewpoint will be described. Also, the recommended moving speed and the movable range of the virtual viewpoint may be generated by a manual input, or may be automatically generated with reference to material data. For example, the virtual viewpoint auxiliary information generation unit 5 can obtain a maximum moving speed or an average moving speed of the object based on the three-dimensional model of the object, and can set the recommended moving speed of the virtual viewpoint based on the maximum moving speed or the average moving speed. In addition, the virtual viewpoint auxiliary information generation unit 5 may obtain the shape and size of the image-capturing region based on the three-dimensional model of the background, and may set the speed suitable for the shape and size of the image-capturing region as the recommended moving speed of the virtual viewpoint. The virtual viewpoint moves at the recommended moving speed.

Like the recommended moving speed of the virtual viewpoint, the shape and size of the image-capturing region can be obtained based on the three-dimensional model of the background, and the movable range of the virtual viewpoint can also be obtained based on the image-capturing region. The virtual viewpoint is changed within the movable range.

Example of Scene Identifying Information

When the image capturing units 1 capture a video image of a stadium game or the like, the virtual viewpoint auxiliary information generation unit 5 detects a highlight scene during the game based on the captured video image and records the image capturing time of the highlight scene or the like for each scene. At this time, an identifier for identifying a scene is recorded together with the image capturing time. The virtual viewpoint auxiliary information generation unit 5 generates, for example, the scene identification information as illustrated in FIG. 6 based on these pieces of information. In the case of automatically generating the scene identifying information, the virtual viewpoint auxiliary information generation unit 5 can acquire, for example, audio data on the stadium from the material data, and can generate the scene identification information based on a long time of the audio. In other words, the virtual viewpoint auxiliary information generation unit 5 can detect an occurrence of a highlight scene or the like based on audio data on the stadium from the material data. In addition, the virtual viewpoint auxiliary information generation unit 5 can generate the scene identifying information about scenes in which the user is highly interested in cooperation with a social networking service (SNS) or the like.

Furthermore, the virtual viewpoint auxiliary information generation unit 5 is desirably configured to record the virtual viewpoint position and orientation information, which enables the user to actually view the scene identified by the scene identifying information, together with the scene identifying information. With this configuration, when time information is designated based on the scene identifying information, a video image of the scene can be displayed based on the virtual viewpoint position and orientation information corresponding to the time information. Consequently, time and labor for the user to search for objects can be eliminated and thus the user's convenience can be enhanced.

Further, the scene identifying information is provided with thumbnail images or the like for the scene identified by the scene identifying information, thereby facilitating the identification of the scene. The virtual viewpoint used when the thumbnail images are generated is desirably a virtual viewpoint identified by the virtual viewpoint position and orientation information recorded together with the scene identifying information described above. With this configuration, when the user selects a thumbnail image for the scene for which the video image from the virtual viewpoint is to be generated from among the thumbnail images, the operation unit 8 can perform the following processing. That is, the operation unit 8 can display the thumbnail image, which is selected by the user, in an enlarged manner. Further, the operation unit 8 designates the display as well as the time and the virtual viewpoint position and orientation information based on the scene identifying information corresponding to the thumbnail image selected by the user, and instructs the video image generation unit 6 to generate the video image from the virtual viewpoint. Then, upon generation of the video image from the virtual viewpoint by the video image generation unit 6, the operation unit 8 replaces the thumbnail image with the video image from the virtual viewpoint, and displays the video image. Specifically, the video image from the virtual viewpoint displayed on the display unit 9 is displayed on the virtual viewpoint selection unit 10 as the thumbnail image, and the video image from the virtual viewpoint generated by the video image generation unit 6 based on the scene identifying information corresponding to the thumbnail image selected by the user is displayed on the display unit 9. This configuration makes it possible to generate the video image from the virtual viewpoint that enables continuous operation of the virtual viewpoint from the image selected as the thumbnail image by the user.

With this configuration, there is no need to generate a video image from a virtual viewpoint with a large load and capacity until the user selects a scene. Accordingly, an advantageous effect that, for example, it is possible to reduce traffic even when mobile data communication or the like is used can be expected.

Figure 8:
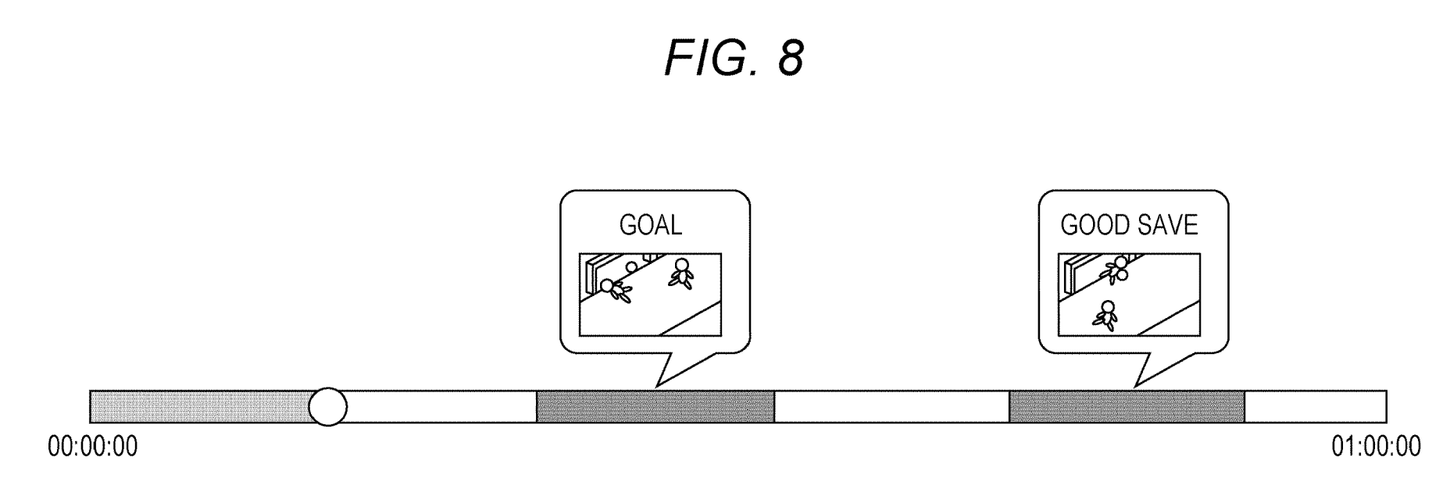
FIG. 8 is a diagram illustrating a modified example of a time indication unit.

In addition, as illustrated in FIG. 8, the operation unit 8 may, for example, use different colors to clearly indicate the time recorded on the scene identifying information for the time indication unit 11. Further, the display of the scene name of the scene and thumbnail images on the time indication unit 11 can facilitate the identification of the time and the scene.

Object Identifying Information

Figure 9:
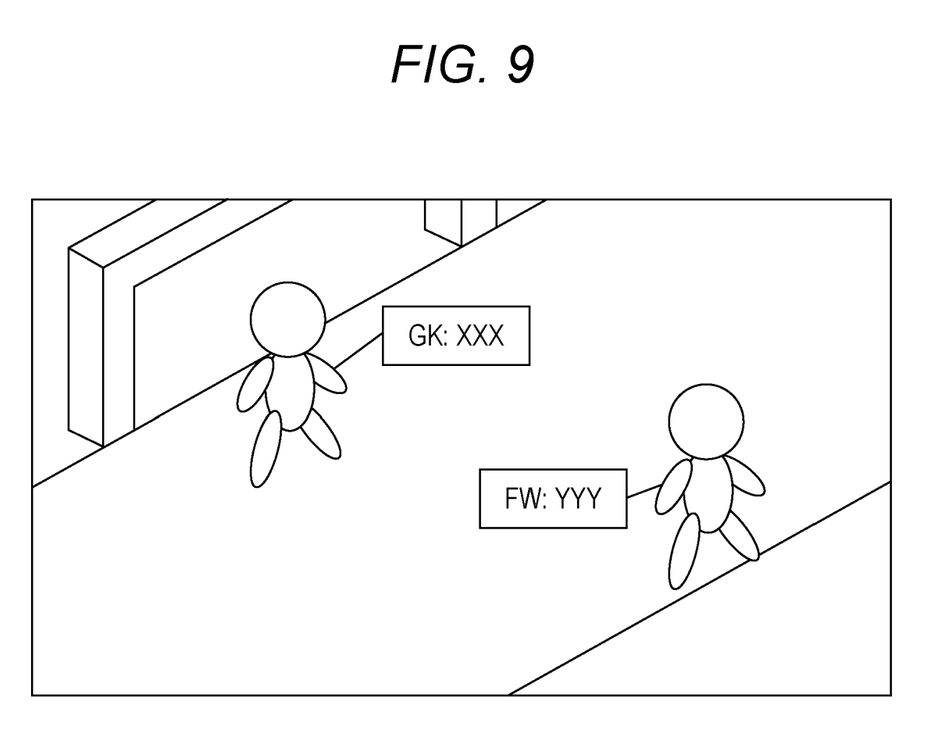
FIG. 9 is a diagram illustrating a modified example of a display unit.

The object identifying information includes information for identifying each object within the viewing angle during the operation for the virtual viewpoint. The object identifying information is used to facilitate the user to identify objects, for example, when the user wishes to generate a video image from a virtual viewpoint in which a specific player is captured within the viewing angle. Specifically, the virtual viewpoint auxiliary information generation unit 5 generates, as the object identifying information, data that associates the three-dimensional model of each object in material data with information for identifying the object (player). The operation unit 8 can display, in a superimposed manner, information, such as an object name, on the object in the video image from the virtual viewpoint, for example, as illustrated in FIG. 9, by using the object identifying information. Accordingly, the user's convenience can be enhanced. FIG. 9 illustrates an example in which the object name is constantly displayed. However, the object name need not necessarily be displayed constantly. For example, a user interface for, for example, displaying the object name only when a mouse pointer is superimposed on the player may be used.

As described above, in the present exemplary embodiment, the virtual viewpoint auxiliary information generation unit 5 generates the virtual viewpoint auxiliary information for assisting the uses operation performed when a video image from a virtual viewpoint is generated, and stores the generated virtual viewpoint auxiliary information in the second storage unit 4b. The operation unit 8 displays, on the display unit 9, the video image from the virtual viewpoint corresponding to the scene designated by the user, and also displays the time indication unit 11 for indicating the image capturing time of the video image. Further, the operation unit 8 displays, on the virtual viewpoint selection unit 10, a video image from another virtual viewpoint corresponding to the scene as a thumbnail image based on the virtual viewpoint auxiliary information. When the user selects the thumbnail image displayed on the virtual viewpoint selection unit 10, the video image generation unit 6 generates the video image from the virtual viewpoint corresponding to the thumbnail image selected by the user. Then, the operation unit 8 replaces the video image from the virtual viewpoint generated by the video image generation unit 6 with the video image from the virtual viewpoint displayed on the display unit 9. Further, the operation unit 8 displays information for identifying objects displayed on the display unit 9. Furthermore, the operation unit 8 displays, in a distinguished manner, a time zone for a specific scene on the time indication unit 11, and displays information indicating the type of the specific scene at the position corresponding to the image capturing time of the scene. This configuration facilitates the user to, for example, determine the position and orientation of a virtual viewpoint, and identify a scene. Consequently, the user's convenience for generating the virtual viewpoint content can be enhanced.

Other Configurations

In addition, in the present exemplary embodiment, the first storage unit 4a that records material data and the second storage unit 4b that records virtual viewpoint auxiliary information are described as different storage units. However, the first storage unit 4a and the second storage unit 4b need not necessarily be different storage units, but instead may be the same storage unit.

The configuration illustrated in FIG. 1 is merely an example, and various modified examples can be applied. For example, the operation unit 8 may be connected to the system illustrated in FIG. 1 via a communication network such as the Internet. In this case, the operation unit 8 can be provided with auxiliary information from the second storage unit 4b via the Internet, and can cause the display unit 9 to display the video image based on the auxiliary information. Further, in response to a user's operation on the video image displayed on the display unit 9, the position and orientation of the virtual viewpoint are determined, and the information is transmitted to the video image generation unit 6 via the Internet. Also, with this configuration, technical effects based on the present exemplary embodiment can be obtained. A plurality of operation units 8 may be provided. As another example, the image capturing system, the video image generation system, and the operation unit 8 may be connected via a communication network such as the Internet. In this configuration, the image capturing system includes the image capturing unit 1, the synchronization unit 2, the material data generation unit 3, and the first storage unit 4a. The video image generation system includes the virtual viewpoint auxiliary information generation unit 5, the second storage unit 4b, and the video image generation unit 6.

The exemplary embodiments described above are merely specific examples for carrying out the present disclosure, and the technical scope of the present disclosure should not be limitatively interpreted by the exemplary embodiments. That is, the present disclosure can be carried out in various forms without departing from the technical idea or the main features of the present disclosure.

According to the present exemplary embodiment, it is possible to enhance the user's convenience for generating a video image from a virtual viewpoint.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2018-007159, filed Jan. 19, 2018, which is hereby incorporated by reference herein in its entirety.

What is claimed is:

1. An information processing apparatus comprising:
one or more processors;
wherein the one or more processors function as the following units:
a generation unit configured to generate scene information including type information and time information, the type information indicating a type of a specific event occurring in an image-capturing region in which an image is captured by a plurality of cameras and occurring in a part of the capturing period by the plurality of cameras, the time information indicating a time when the specific event has occurred in the part of the capturing period; and
a provision unit configured to provide an output destination of material data with the scene information generated by the generation unit, the material data being generated from a plurality of captured images obtained by the plurality of cameras capturing images of the image-capturing region from different directions, the material data being used to generate a virtual viewpoint image depending on a position of a virtual viewpoint and a view direction from the virtual viewpoint.

2. The information processing apparatus according to claim 1, wherein
the generation unit further generates the material data, and
the provision unit further provides the material data.

3. The information processing apparatus according to claim 1, wherein
the generation unit further generates recommended viewpoint information about the position and the orientation of the virtual viewpoint for viewing the event depending on an occurrence position of the event, and
the provision unit further provides the recommended viewpoint information.

4. The information processing apparatus according to claim 1, further comprising a detection unit configured to detect an occurrence of a specific event in the image-capturing region by using at least one of audio data and one or more of the plurality of captured images.

5. The information processing apparatus according to claim 1, wherein the material data includes three-dimensional geometric data on an object detected from the captured images, texture data on the object, three-dimensional geometric data on a background, and texture data on the background.

6. The information processing apparatus according to claim 1, wherein
the generation unit further generates speed information indicating a recommended moving speed of the virtual viewpoint, and
the provision unit further provides the speed information.

7. The information processing apparatus according to claim 6, wherein the generation unit determines the recommended moving speed based on at least one of a moving speed of an object in the image-capturing region, a size of the image-capturing region, and a shape of the image-capturing region.

8. The information processing apparatus according to claim 1, wherein
the generation unit further generates range information indicating a movable range of the virtual viewpoint, and
the provision unit further provides the range information.

9. An information processing apparatus comprising:
an obtainment unit configured to obtain:
scene information including type information and time information, the type information indicating a type of a specific event occurring in an image-capturing region in which an image is captured by a plurality of cameras and occurring in a part of the capturing period by the plurality of cameras, the time information indicating a time when the specific event has occurred in the part of the capturing period; and
material data generated from a plurality of captured images obtained by the plurality of cameras capturing images of the image-capturing region from different directions; and
a generation unit configured to generate, based on the obtained scene information and the obtained material data, a virtual viewpoint image about the specific event represented by the scene information.

10. The information processing apparatus according to claim 9, wherein
the obtainment unit further obtains recommended viewpoint information about a position of a virtual viewpoint and a view direction from the virtual viewpoint for viewing the specific event represented by the scene information, and
the generation unit generates, based on the obtained recommended viewpoint information, the obtained scene information, and the obtained material data, a virtual viewpoint image representing an appearance of the specific event from a virtual viewpoint depending on the recommended viewpoint information.

11. The information processing apparatus according to claim 10, further comprising a display control unit configured to cause a first virtual viewpoint image depending on the position of the virtual viewpoint and the view direction from the virtual viewpoint and a second virtual viewpoint image depending on the recommended viewpoint information to be displayed on a setting screen for setting the position and the orientation of the virtual viewpoint.

12. The information processing apparatus according to claim 11, wherein a space size of the second virtual viewpoint image is smaller than a space size of the first virtual viewpoint image.

13. The information processing apparatus according to claim 10, further comprising a display control unit configured to cause a timeline to be displayed on a setting screen for setting the position of the virtual viewpoint and the view direction from the virtual viewpoint, wherein
the timeline represents a period of the specific event, and
the display control unit causes a virtual viewpoint image depending on the recommended viewpoint information to be displayed with the timeline.

14. An information processing method, the information processing method comprising:
generating scene information including type information and time information, the type information indicating a type of a specific event occurring in an image-capturing region in which an image is captured by a plurality of cameras and occurring in a part of the capturing period by the plurality of cameras, the time information indicating a time when the specific event has occurred in the part of the capturing period; and
providing a device of an output destination of material data with the scene information generated in the generating, the material data being generated from a plurality of captured images obtained by the plurality of cameras capturing images of the image-capturing region from different directions, the material data being used to generate a virtual viewpoint image depending on a position of a virtual viewpoint and a view direction from the virtual viewpoint.

15. An information processing method, the information processing method comprising:
obtaining scene information including type information and time information, the type information indicating a type of a specific event occurring in an image-capturing region in which an image is captured by a plurality of cameras and occurring in a part of the capturing period by the plurality of cameras, the time information indicating a time when the specific event has occurred in the part of the capturing period; and
material data generated from a plurality of captured images obtained by the plurality of cameras capturing images of the image-capturing region from different directions; and
generating, based on the obtained scene information and the obtained material data, a virtual viewpoint image about the specific event represented by the scene information.

16. A non-transitory computer-readable storage medium storing a program for causing a computer execute an information processing, the method comprising:
generating scene information including type information and time information, the type information indicating a type of a specific event occurring in an image-capturing region in which an image is captured by a plurality of cameras and occurring in a part of the capturing period by the plurality of cameras, the time information indicating a time when the specific event has occurred in the part of the capturing period; and
providing a device of an output destination of material data with the scene information generated in the generating, the material data being generated from a plurality of captured images obtained by the plurality of cameras capturing images of the image-capturing region from different directions, the material data being used to generate a virtual viewpoint image depending on a position of a virtual viewpoint and a view direction from the virtual viewpoint.

17. A non-transitory computer-readable storage medium storing a program for causing a computer that execute an information processing, the method comprising:
obtaining scene information including type information and time information, the type information indicating a type of a specific event occurring in an image-capturing region in which an image is captured by a plurality of cameras and occurring in a part of the capturing period by the plurality of cameras, the time information indicating a time when the specific event has occurred in the part of the capturing period; and
material data generated from a plurality of captured images obtained by the plurality of cameras capturing images of the image-capturing region from different directions; and
generating, based on the obtained scene information and the obtained material data, a virtual viewpoint image about the specific event represented by the scene information.

* * * * *